(12) United States Patent
Yamaguchi

(10) Patent No.: US 7,161,986 B2
(45) Date of Patent: Jan. 9, 2007

(54) DATA TRANSMISSION SYSTEM AND DATA TRANSMITTER/RECEIVER FOR USE THEREIN, AND METHOD THEREOF

(75) Inventor: Hiroshi Yamaguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 743 days.

(21) Appl. No.: 10/308,053

(22) Filed: Dec. 3, 2002

(65) Prior Publication Data

US 2003/0103574 A1 Jun. 5, 2003

(30) Foreign Application Priority Data

Dec. 5, 2001 (JP) ............................. 2001-371082

(51) Int. Cl.
*H04L 27/00* (2006.01)
(52) U.S. Cl. ..................................... 375/259
(58) Field of Classification Search ................ 375/259, 375/215, 294, 373, 374, 375, 376, 371, 354; 370/503, 516; 327/141, 147, 149, 152, 153
See application file for complete search history.

(56) References Cited

U.S. PATENT DOCUMENTS

| | | | |
|---|---|---|---|
| 5,488,641 A | * | 1/1996 | Ozkan ......................... 375/374 |
| 5,621,774 A | | 4/1997 | Ishibashi et al. |
| 5,794,020 A | | 8/1998 | Tanaka et al. |
| 5,877,641 A | * | 3/1999 | Ziegler et al. ............... 327/156 |
| 6,133,770 A | * | 10/2000 | Hasegawa .................... 327/156 |

FOREIGN PATENT DOCUMENTS

| | | |
|---|---|---|
| JP | 57141157 A | 9/1982 |
| JP | 60087514 A | 5/1985 |
| JP | 07123120 A | 5/1995 |
| JP | 09098193 A | 4/1997 |

OTHER PUBLICATIONS

K. Nogami, et al.: "Phase Modulation I/O Interface Circuit"; IEEE International Solid State Circuits Conference, IEEE Service Center, New York, NY, US; vol. 37, Feb. 1, 1994, pp. 108-109, 318.
T. Tanahashi, et al.: "A 2Gbps 21 ch Low-Latency Transceiver Circuit for Inter-Processor Communication"; NEC Research and Development, Nippon Electric Ltd., Tokyo, JP; vol. 43, No. 1, Jan. 2002, pp. 84-89.

* cited by examiner

*Primary Examiner*—Dac Ha
*Assistant Examiner*—Jaison Joseph
(74) *Attorney, Agent, or Firm*—Sughrue Mion, PLLC

(57) ABSTRACT

A system and a method of data transmission that effectively utilizes a band of a transmission line among information processing units to carry out a high-speed transmission without requiring the high-frequency band. Also provided is a data transmission system and a data transmitter/receiver for use therein, and a method thereof that, by transmitting data by a phase of a signal, expands a noise margin, enables the high-speed transmission of the signal, and further eliminates the need for a transmission line having an expensive high-frequency band.

21 Claims, 6 Drawing Sheets

DATA TRANSMISSION SYSTEM AND DATA TRANSMITTER/RECEIVER FOR USE THEREIN, AND METHOD THEREOF

BACKGROUND OF THE INVENTION

The present invention relates to a system and a method of data transmission, and more particular to a system and a method of data transmission that effectively utilizes a band of a transmission line among information processing units to carry out a high-speed transmission.

As a rule, in the event of a base-band method, a high-speed transmission technique among information processing units requires a high-frequency band because digital signals are transmitted in a form of pulse. On the other hand, simultaneously with meeting the requirement of being transmitted at a high speed, in recent years it is also required to reduce the terminal number.

So as to meet this demand, for example, as disclosed in ISSCC2001 "A 2 Gbps 21CH Low-LATENCY TRANSCEIVER CIRCUIT FOR INTER-PROCESSOR COMMUNICATION", it has been proposed that, by providing a clock signal line other than a data signal line, the transmission is made at high speed without incurring a decline in latency due to coding.

The technique disclosed in the above-mentioned prior art document, however, has the defect that a high-frequency band is necessary for a transmission line. That is, the use of the high-frequency band for the transmission line invites the possibility that data is impossible to transmit precisely as a result of being affected by waveform rounding. In particular, in the event that a cable, which becomes a transmission line, is lengthened like a large-sized computer, its influence becomes big.

Accordingly, the technique of carrying out the high-speed transmission with the waveform caused to carry data, employing a high-frequency band, has reached the limit by now.

SUMMARY OF THE INVENTION

The present invention has been accomplished in consideration of the above-mentioned problems, and an objective thereof is to provide the high-speed transmission technique that does not require the high-frequency band.

Also, an objective of the present invention is to provide a data transmission system and a data transmitter/receiver for use therein, and a method thereof that, by transmitting data by a phase of a signal, expands a noise margin, enables the high-frequency transmission of the signal, and further eliminates the need for the transmission line having the expensive high-frequency band.

A first invention for accomplishing the above-mentioned objective is a data transmission system comprising:

a generator for generating a reference signal, and a phase difference signal having a certain phase difference as against said reference signal wherein said phase difference and data were caused to correspond;

a selector means for selecting the phase difference signal that was caused to correspond to data that was input;

a phase difference detector for detecting a phase difference between said reference signal and the phase difference signal selected in said selector; and data output means for outputting data that was caused to correspond to the phase difference detected in said phase difference detector.

A second invention for accomplishing the above-mentioned objective is characterized in providing said selection means, said phase difference detection means, and said data output means in a plural in the above-mentioned first invention.

A third invention for accomplishing the above-mentioned objective is a data transmission system comprising:

a generator for generating a phase difference signal having a certain phase difference as against a reference signal wherein said phase difference and data were caused to correspond;

a selector for selecting the phase difference signal that was caused to correspond to data that was input;

a generator for generating said reference signal from the phase difference signal selected in said selector;

a phase difference detector for detecting a phase difference between said reference signal and the phase difference signal selected in said selector; and data output means for outputting data that was caused to correspond to the phase difference detected in said phase difference detector.

A fourth invention for accomplishing the above-mentioned objective is characterized in providing said selection means, said phase difference detection means, and said data output means in a plural in the above-mentioned third invention.

A fifth invention for accomplishing the above-mentioned objective is a data transmitter comprising:

a generator for generating a reference signal, and a phase difference signal having a certain phase difference as against said reference signal wherein said phase difference and data were caused to correspond; and a selector for selecting and outputting the phase difference signal that was caused to correspond to data that was input.

A sixth invention for accomplishing the above-mentioned objective is characterized in providing said selector in a plural in the above-mentioned fifth invention.

A seventh invention for accomplishing the above-mentioned objective is a data transmitter comprising:

a generator for generating a phase difference signal having a certain phase difference as against a reference signal wherein said phase difference and data were caused to correspond; and a selector for selecting the phase difference signal that was caused to correspond to data that was input.

A eighth invention for accomplishing the above-mentioned objective is characterized in providing said selector in a plural in the above-mentioned seventh invention.

A ninth invention for accomplishing the above-mentioned objective is a data receiver for receiving a phase difference signal having a certain phase difference as against a reference signal wherein said phase difference and data were caused to correspond, comprising:

a phase difference detector for detecting a phase difference between said reference signal and the phase difference signal; and data output means for outputting data that was caused to correspond to the phase difference detected in said phase difference detector.

A tenth invention for accomplishing the above-mentioned objective is characterized in providing said phase difference detector and said data output means in a plural in the above-mentioned ninth invention.

A eleventh invention for accomplishing the above-mentioned objective is a data receiver for receiving a phase difference signal having a certain phase difference as against a reference signal wherein said phase difference and data were caused to correspond, comprising:

a generator for generating said reference signal from the phase difference signal;

a phase difference detector for detecting a phase difference between said reference signal and the phase difference signal; and data output means for outputting data that was caused to correspond to the phase difference detected in said phase difference detector.

A twelfth invention for accomplishing the above-mentioned objective is characterized in providing said phase difference detector and said data output means in a plural in the above-mentioned eleventh invention.

A thirteenth invention for accomplishing the above-mentioned objective is a data transmission system comprising:

a first generator for generating a first transmission signal that was caused to correspond to data being transmitted one by one, said first transmission signal having a certain led phase as against a phase of a reference signal;

a second generator for generating a second transmission signal that was caused to correspond to data being transmitted one to one, said second transmission signal having a certain lagged phase as against a phase of a reference signal;

a selector for selecting the transmission signal that corresponds to data to be input, out of said first transmission signal and the second transmission signal;

a transmitter for transmitting said reference signal, and the transmission signal selected in said selection means;

a receiver for receiving said reference signal and said transmission signal to detect a phase difference between said reference signal and said transmission signal, and to identify whether the received transmission signal is the first transmission signal or the second transmission signal; and means for outputting data that was caused to correspond to the said identified transmission signal one to one.

A fourteenth invention for accomplishing the above-mentioned objective is a data transmission method comprising the steps of:

generating a reference signal, and a phase difference signal having a certain phase difference as against said reference signal wherein said phase difference and data were caused to correspond;

selecting the phase difference signal that was caused to correspond to data that was input;

transmitting said reference signal and said selected phase difference signal;

receiving the reference signal and the phase difference signal;

detecting a phase difference between said received reference signal and said received phase difference signal; and outputting data that was caused to correspond to said detected phase difference.

A fifteenth invention for accomplishing the above-mentioned objective is characterized in carrying out the steps of selecting said phase difference signal, detecting a phase difference between said reference signal and said phase difference signal, and outputting data that was caused to correspond to said detected phase difference in parallel by transmission line in the above-mentioned fourteenth invention.

A sixteenth invention for accomplishing the above-mentioned objective is a data transmission method comprising the steps of:

generating a phase difference signal having a certain phase difference as against a reference signal wherein said phase difference and data were caused to correspond;

selecting the phase difference signal that was caused to correspond to data that was input;

transmitting said selected phase difference signal;

receiving said phase difference signal;

generating said reference signal from said received phase difference signal;

detecting a phase difference between said received reference signal and said received phase difference signal; and outputting data that was caused to correspond to said detected phase difference.

A seventeenth invention for accomplishing the above-mentioned objective is characterized in carrying out the steps of selecting said phase difference signal, detecting a phase difference between said reference signal and said phase difference signal, and outputting data that was caused to correspond to said detected phase difference in parallel by transmission line in the above-mentioned sixteenth invention.

A eighteenth invention for accomplishing the above-mentioned objective is a data transmission system comprising:

a first delay circuit for delaying a phase of a predetermined base signal by a predetermined time to output it as a first delay signal;

a second delay circuit for delaying a phase of a predetermined base signal by a different delay time from the delay time of said first delay circuit to output it as a second delay signal;

a selector for selecting either one of said base signal or said second delay signal by data, which was input, to output it as a data signal wherein said data to be input, and said base signal and said second delay signal are caused to pre-correspond;

synchronous output means for synchronizing said first delay signal with the output of said selector to output it as a reference signal;

a phase comparator for detecting a phase difference between said data signal and said reference signal to output an identification signal for identifying said base signal or said second delay signal that corresponds to said phase difference; and a latch circuit for latching said identification signal to restore data that corresponds to a signal to be identified by said identification signal.

A nineteenth invention for accomplishing the above-mentioned objective is characterized in providing said selector, said phase comparator, and said latch circuit in a plural in the above-mentioned eighteenth invention.

A twenty invention for accomplishing the above-mentioned objective is a data transmission system comprising:

a delay circuit for delaying a phase of a predetermined base signal by a predetermined time to output it as a delay signal;

a selector for selecting either one of said base signal or said delay signal by data, which was input, to output it as a data signal wherein said data to be input, and said base signal and said second delay signal are caused to pre-correspond;

a PLL circuit for generating a reference signal from said data signal;

a phase comparator for detecting a phase difference between said data signal and said reference signal to output an identification signal for identifying said base signal or said second delay signal that corresponds to said phase difference; and a latch circuit for latching said identification signal to restore data that corresponds to a signal to be identified by said identification signal.

A twenty-first invention for accomplishing the above-mentioned objective is characterized in providing said selector, said phase comparator, and said latch circuit in a plural in the above-mentioned twenty invention.

In the present invention, a signal having a base frequency and a signal having a certain phase difference are provided on the data transmission side to select this by data being transmitted. And it is characteristic thereof to detect a phase difference by the phase comparator on the reception side, to convert a phase lead and a phase lag into pulse, and to demodulate it by a RS latch.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

A first embodiment of the present invention will be explained.

Figure 1:
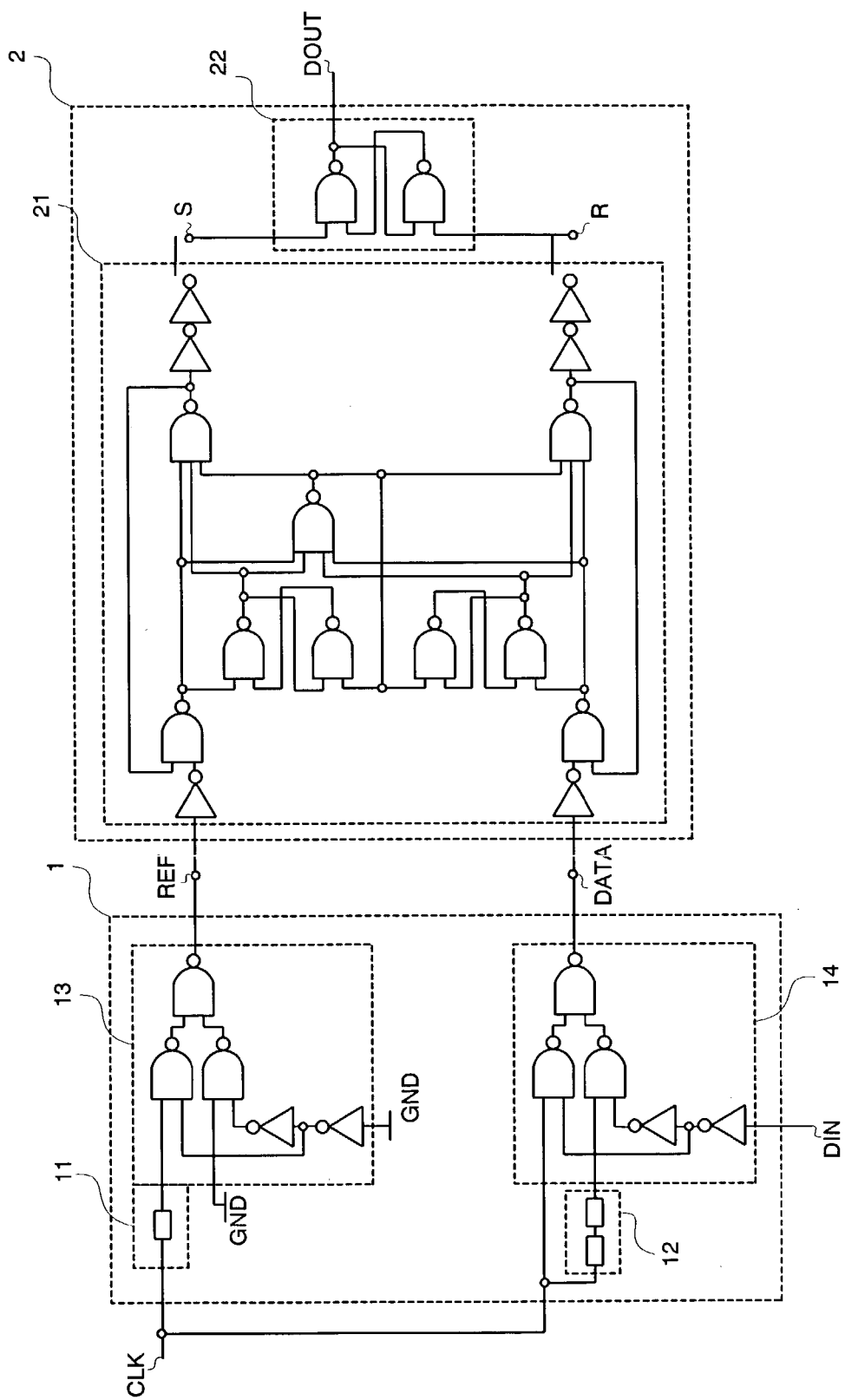
FIG. 1 is a block diagram of the data transmission system in the first embodiment.

FIG. 1 is a block diagram of the data transmission system in the first embodiment of the present invention.

In FIG. 1, 1 is a data transmitter, and 2 is a data receiver.

The data transmitter 1 includes a delay circuit 11 and a delay circuit 12, and a multiplexer 13 and a multiplexer 14.

The delay circuit 11 is configured so as to delay by one unit-time a signal CLK having a base frequency from the outside to output it. The delay circuit 12, which has two times the delay time of the delay circuit 11, is configured so as to delay the signal CLK by two unit-times to output it.

The multiplexer 13 constantly selects the output of the delay circuit 11 to output it as a reference signal REF. Additionally, the multiplexer 13 is employed for absorbing the time to be taken for treating the multiplexer 14 and for synchronizing with the output of the multiplexer 14. Accordingly, if the treatment of the multiplexer 14 is very fast, and the treatment time can be ignored, the multiplexer 13 is not be employed, and the output of the delay circuit 11 may be output as the reference signal REF as it stands.

Figure 2:
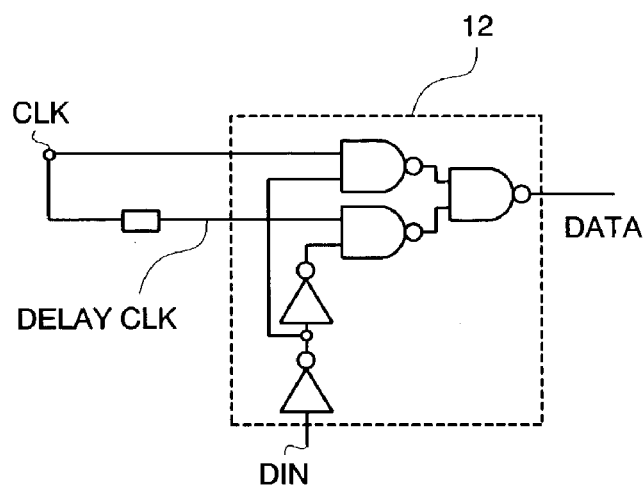
FIG. 2 is a view for explaining a configuration of the multiplexer 14.
Figure 3:
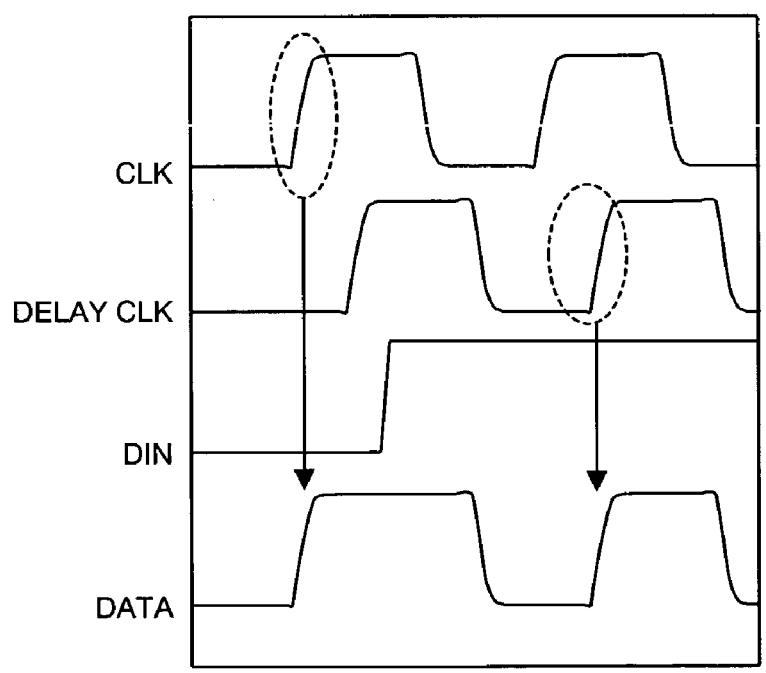
FIG. 3 is a view for explaining an operation of the multiplexer 14.

The multiplexer 14 selects either of the signal CLK or the signal from the delay circuit 12 by data DIN to output it as DATA. Specifically explaining, as shown in FIG. 2, the multiplexer 14 inputs the signal CLK and the signal from the delay circuit 12 (the signal of which the lag phase was delayed by two unit-times as against the signal CLK). And, as shown in FIG. 3, when the data DIN is "0", the signal CLK is selected, and is output as the data DATA, and when the data DIN is "1", the signal from the delay circuit 12 is selected, and is output as the transmission data DATA. That is, the phase of the transmission data DATA to be output from the multiplexer 14 is one unit-time ahead of that of the reference signal REF to be output from the multiplexer 13 in the event of data DIN="0, and the transmission data DATA is output by one unit-time delay as against the phase of the reference signal REF in the event of data DIN="1".

In such a configuration, the reference signal REF and the transmission data DATA are output from the data transmitter 1.

The data receiver 2, into which the reference signal REF and the transmission data DATA are input, includes a phase comparator 21 and an RS latch 22.

The phase comparator 21, which takes the reference signal REF and the transmission data DATA as the input, is configured so as to detect a phase difference between the reference signal REF and the transmission data DATA. And, in the event that the phase of the transmission data DATA is ahead of that of the reference signal, a phase-lead detection signal R having a pulse width of the phase difference amount is output. On the other hand, in the event that the phase of the transmission data DATA is behind that of the reference signal REF, a phase lag detection signal S having a pulse width of the phase difference amount is output.

That is, in the event that the phase of the transmission data DATA is one unit-time ahead of that of the reference signal REF, the phase-lead detection signal R having a pulse width equivalent to one unit-time is output. On the other hand, in the event that the phase of the transmission data DATA is one unit-time behind that of the reference signal REF, the phase lag detection signal S having a pulse width equivalent to one unit-time is output.

The RS latch 22 takes the phase lag detection signal S and the phase-lead detection signal R as the input. And, a data output terminal DOUT becomes "0" when the phase-lead detection signal R is applied to the reset input, and becomes "1" when the phase lag detection signal S is applied to the set input, and an RS latch 22 is configured so as to obtain demodulation output DOUT.

Additionally, a NAND circuit, an inverter circuit and the delay circuit, and also the phase comparator and the RS latch in the foregoing embodiment are well-known to those skilled in the art, and also, since they have no direct relation with the present invention, detailed configurations thereof are omitted.

Next, an operation of the data transmission system in the foregoing configuration will be explained.

Figure 4:
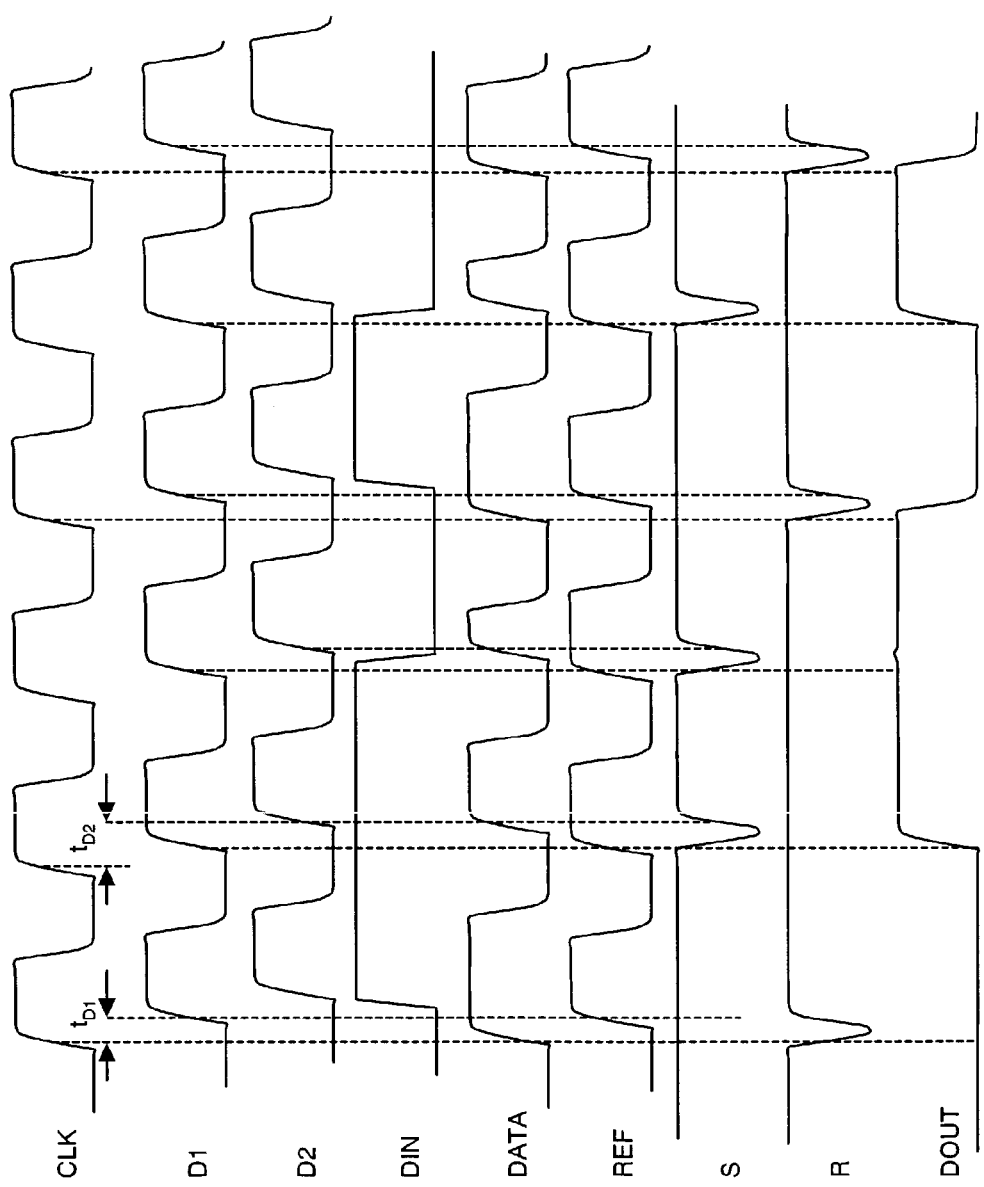
FIG. 4 is a time chart for explaining an operation of the first embodiment.

At first, the operation of the data transmitter 1 will be explained with the use of a timing chart of FIG. 4.

The data transmitter 1 inputs the signal CLK having a base frequency, delays this by one unit-time $t_{D1}$, by the delay circuit 11, and outputs it as the reference signal REF via the multiplexer 13.

Also, the signal CLK is input into the multiplexer 14, and into the delay circuit 12, and the signal delayed by two unit-times $t_{D2}$ is also input into the multiplexer 14.

In the multiplexer 14, in the event that the data DIN is "0", the signal CLK (the signal that is not delayed) is selected, and is output as the transmission data DATA. On the other hand, when the data DIN is "1", the signal CLK delayed by two unit-times $t_{D2}$ by the delay circuit 12 is selected, and is output as the transmission data DATA. Thereby, as shown in FIG. 3, at the time of data DIN="0", the transmission data DATA is ahead of the reference signal REF by the phase equivalent to one unit-time $t_{D1}$, and at the time of DIN="1", as to the transmission data, one which was delayed by the phase equivalent to one unit-time $t_{D1}$, as against the reference signal REF is transmitted.

In the data receiver 2, the reference signal REF and the transmission data DATA are received to make a comparison of the phases by the phase comparator 21.

The phase comparator 21 detects a phase difference between the transmission data DATA and the reference signal REF to output the phase-lead detection signal R having a pulse width of a phase difference amount $t_{D1}$ in the event that the phase of the transmission data DATA is ahead of that of the reference signal REF. Also, in the event that the phase of the transmission data DATA is behind that of the reference signal REF, it outputs the phase lag detection signal S having a pulse width of a phase difference amount $t_{D1}$.

The RS latch 22 takes DOUT as "1" when the phase lag detection signal S is applied to the set input, and takes DOUT as "0" when the phase-lead detection signal R is applied to the reset input.

And, the data that has been transmitted can be obtained from the level of the demodulation output DOUT.

As mentioned above, in the present invention, causing the phase of the signal to carry information allows the noise margin to be expanded, thus enabling the high-frequency transmission of the signal.

A second embodiment of the present invention will be explained.

In the foregoing embodiment, the case was explained that the signal line for transmitting the reference signal REF and the signal line for transmitting the transmission data DATA were in a pair relationship.

However, also in the event of transmitting a plurality of kinds of data in different signal lines, as to the reference signal REF that becomes a reference, one is enough.

Thus, the embodiment of transmitting a plurality of kinds of data with the use of one reference signal REF will be explained.

Figure 5:
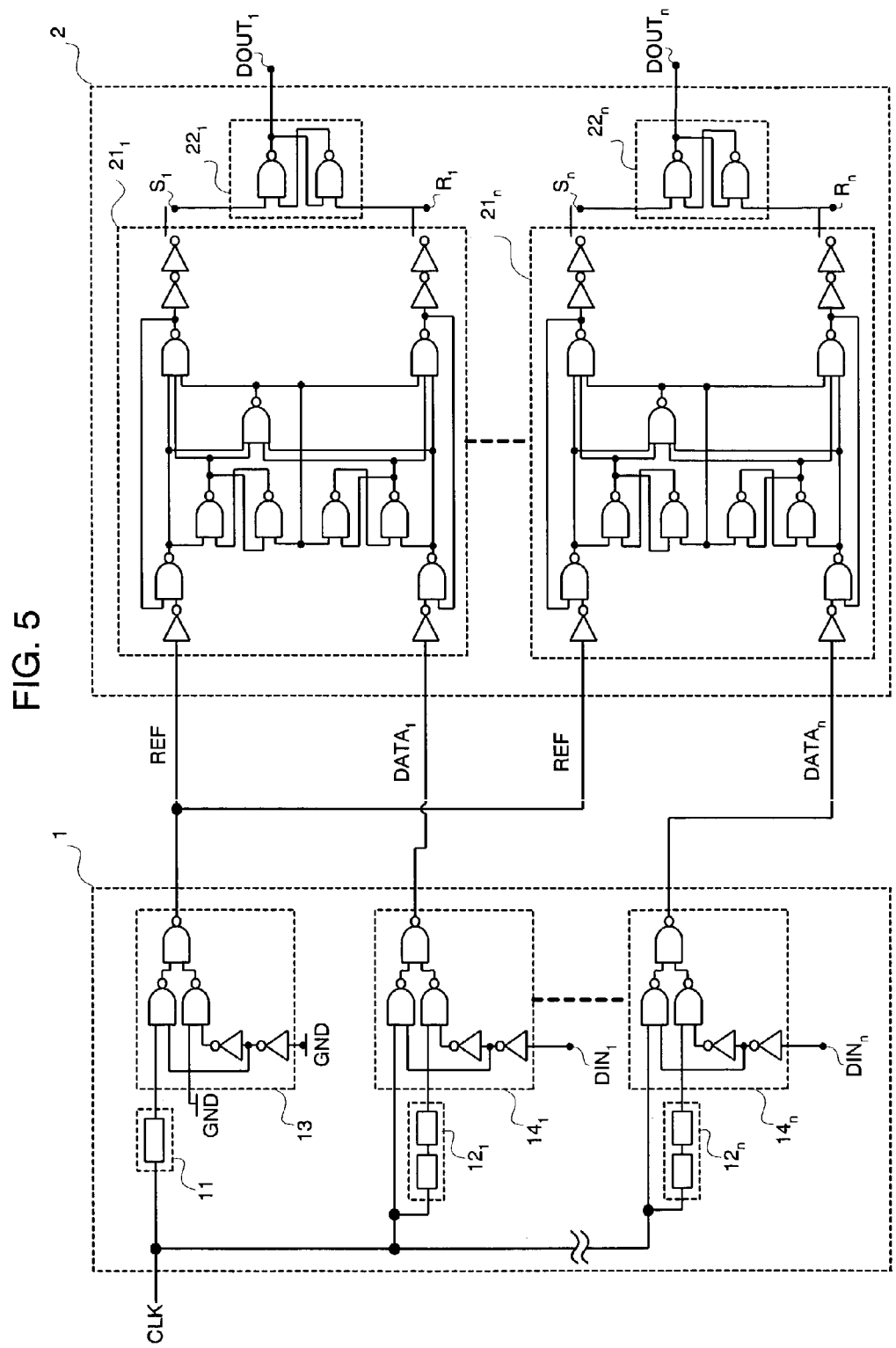
FIG. 5 is a block diagram of the data transmission system in the second embodiment.

FIG. 5 is a block diagram of the data transmission system in the second embodiment of the present invention.

A first point in which the second embodiment differs from the foregoing embodiment is that the data transmitter 1 includes a plurality of delay circuits $12_1$ to $12_n$ (n is an integer) and a plurality of multiplexers $14_1$ to $14_n$ (n is an integer). As to the number of the delay circuits $12_1$ to $12_n$ and the multiplexers $14_1$ to $14_n$, there is the number equivalent to the signal lines of data to be desired to be transmitted, and one delay circuit and one multiplexer, which become one set, perform a similar operation to that of the delay circuit 12 and the multiplexer 14 in the foregoing embodiment. And, the reference signal REF from the multiplexer 13, and transmission data $DATA_1$ to transmission data $DATA_n$ output from the multiplexers $14_1$ to $14_n$ are transmitted.

Also, a second point in which the second embodiment differs from the foregoing embodiment is that the data receiver 2 includes a plurality of phase comparators $21_1$ to $21_n$ (n is an integer) and a plurality of RS latches $22_1$ to $22_n$ (n is an integer). As to the number of the phase comparators $21_1$ to $21_n$ and the RS latches $22_1$ to $22_n$, there is the number equivalent to the signal lines of data to be desired to be transmitted, and one phase comparator and one RS latch, which become one set, perform a similar operation to that of the phase comparator 21 and the RS latch 22 in the foregoing embodiment. That is, each of the phase comparators $21_1$ to $21_n$, by taking an identical reference signal REF as a reference, detects the lead and the lag of the phases of the transmission data $DATA_1$ to the transmission data $DATA_n$ to be input. Based on the reset input from each of the corresponding phase comparators $21_1$ to $21_n$, each of the RS latches $22_1$ to $22_n$ varies the level of the demodulation output DOUT to obtain the data that has been transmitted.

The above-mentioned configuration allows much more kinds of data to be transmitted.

A third embodiment will be explained.

In the first and second embodiments, a specialized transmission line (signal line) was provided for transmitting the reference signal REF that became a reference of the phase lead or the phase lag of the transmission data.

However, from the viewpoint of retrenchment in the terminal number of the information processing unit, the fewer the transmission line is, the better.

Thus, the third embodiment is characterized in that, by reproducing on the reception side the reference signal REF that becomes a reference of the phase lead or the phase lag of the transmission data, the specialized transmission line for transmitting the reference signal REF was reduced.

Figure 6:
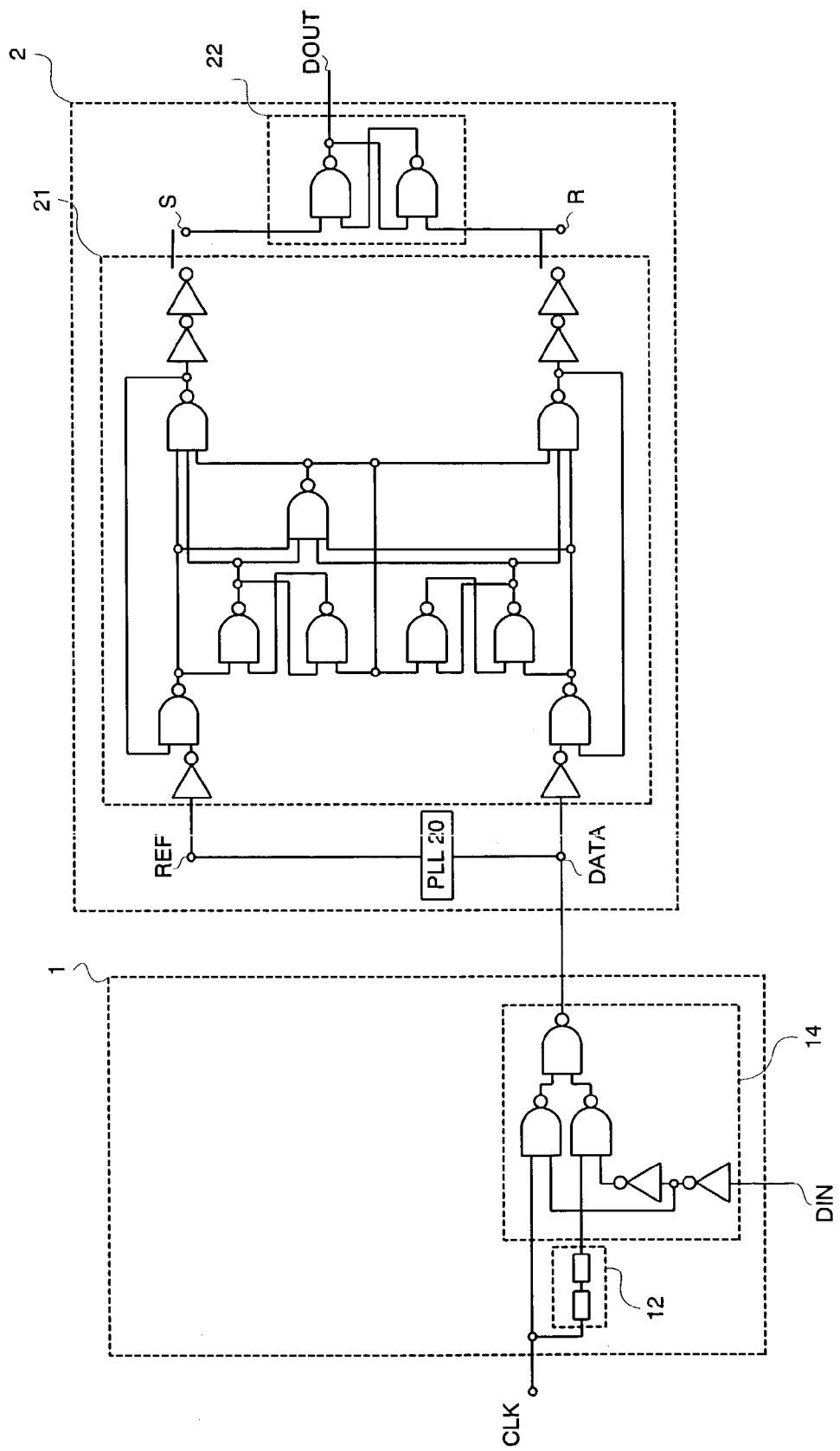
FIG. 6 is a block diagram of the data transmission system in the third embodiment and FIG. 7 is a block diagram of the data transmission system in the fourth embodiment.

FIG. 6 is a block diagram of the data transmission system in the third embodiment of the present invention. Additionally, identical codes are affixed to those similar to that of the first embodiment, and the detailed explanation is omitted.

As shown in FIG. 6, a first point in which the third embodiment differs from the first embodiment is that the delay circuit 11 and the multiplexer 13, which generate the reference signal REF, are deleted in the data transmitter 1. Accordingly, the reference signal REF is not sent from the data transmitter 1. Additionally, a PLL circuit 20 to be described later precisely generates the reference signal REF, whereby as to conditions of a coding method of data to be applied to DIN of the multiplexer 14, it conditions that no DC component exists, and yet the time that "0" and "1" continue is sufficiently shortened as against the response time of the PLL circuit 20. Giving a more detailed description of the latter condition, even though "0" and "1" continue like "000110011", for example, in the event that the time of "000" is sufficiently short as against the response time of the PLL circuit 20, the case that "0" continues like "000" is also allowable. As long as said two conditions are met, the coding method is not specified.

A second point in which the third embodiment differs from the first embodiment is that the data receiver 2 includes the PLL circuit 20. This PLL circuit 20 generates the reference signal REF from the transmission data DATA. That is, the signal of the transmission data DATA is observed as a high-frequency jitter in the PLL circuit 20. It is a well-known technique that the PLL circuit removes the high-frequency litter to obtain the reference signal REF due to its characteristic.

The reference signal REF generated in the PLL circuit 20 is input into one of the terminals of the phase comparator 21 similarly to the first embodiment, and is employed in a reference of the phase comparison of the transmission data DATA. Since the subsequent operation is similar to that of the first embodiment, the detailed explanation is omitted.

As mentioned above, in the third embodiment, further, the effect is obtained that the signal transmission line number is reduced, and no influence by a skew of the reference signal REF and the modulation signal DATA exists.

A fourth embodiment of the present invention will be explained.

The fourth embodiment is an example that the third embodiment was applied to the case of transmitting a plurality of kinds of data.

Figure 7:
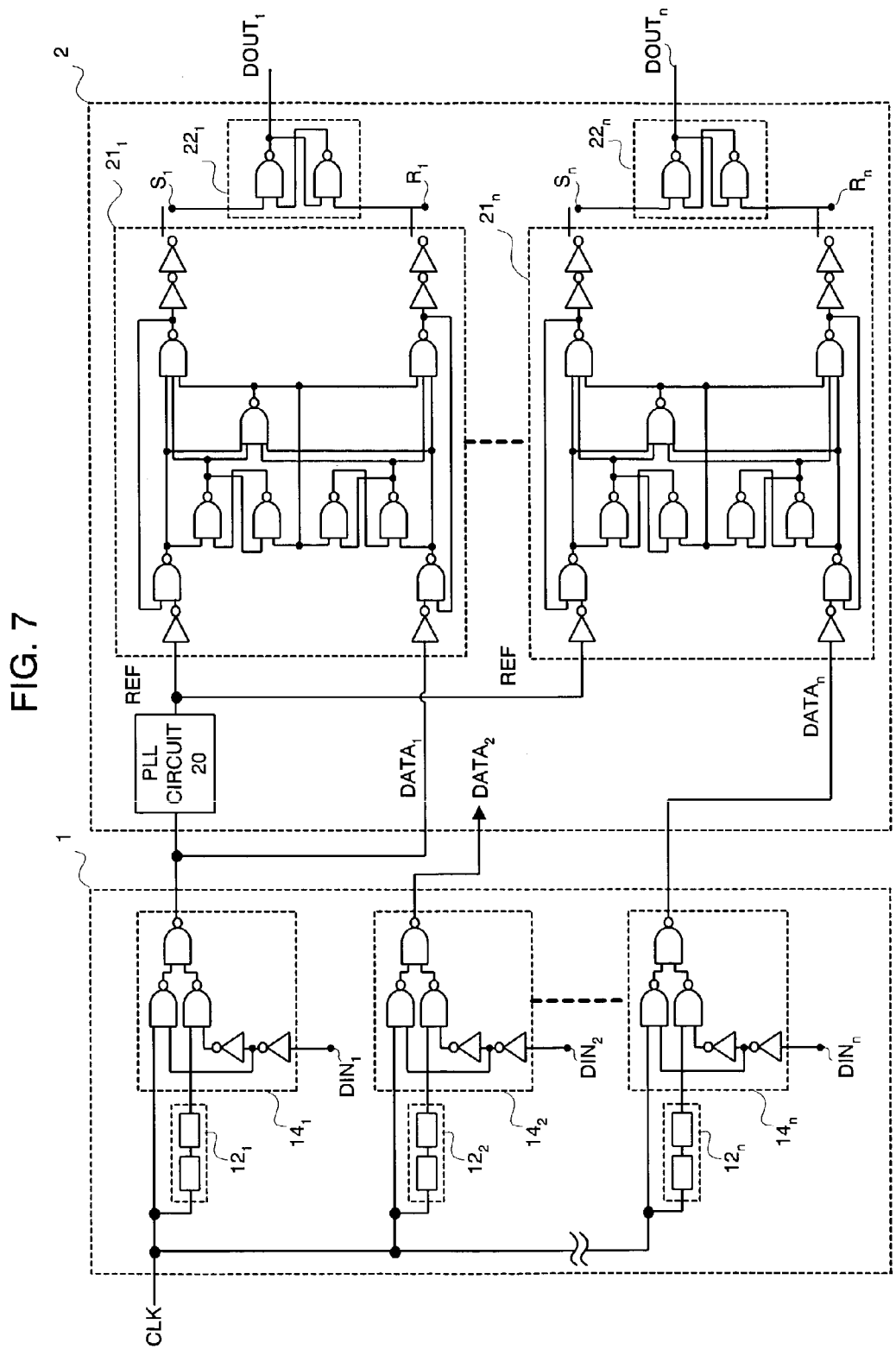

FIG. 7 is a block diagram of the data transmission system in the fourth embodiment of the present invention.

A first point in which the fourth embodiment differs from the foregoing third embodiment is that the data transmitter 1 includes a plurality of delay circuits $12_1$ to $12_1$ (n is an integer) and a plurality of multiplexers $14_1$ to $14_n$ (n is an integer). As to the number of the delay circuits $12_1$ to $12_n$ and the multiplexers $14_1$ to $14_n$, there is the number equivalent to the signal lines of data to be desired to be transmitted, and one delay circuit and one multiplexer, which become one set, perform a similar operation to that of the delay circuit 12 and the multiplexer 14 in the foregoing third embodiment. And, transmission data $DATA_1$ to transmission data $DATA_n$ output from the multiplexers $14_1$ to $14_n$ are transmitted.

Also, a second point in which the fourth embodiment differs from the foregoing third embodiment is that the data receiver 2 includes a plurality of phase comparators $21_1$ to $21_n$ (n is an integer) and a plurality of RS latches $22_1$ to $22_n$ (n is an integer). As to the number of the phase comparators $21_1$ to $21_n$ and the RS latches $22_1$ to $22_n$, there is the number equivalent to the signal lines of data desired to be transmitted, and one phase comparator and one RS latch, which become one set, perform a similar operation to that of the phase comparator 21 and the RS latch 22 in the foregoing embodiment. That is, each of the phase comparators $21_1$ to $21_n$, by taking the identical reference signal REF reproduced by the PLL circuit 20 as a reference, detects the lead and the lag of the phases of the transmission data $DATA_1$ to the transmission data $DATA_n$ to be input. Based on the reset input from each of the corresponding phase comparators $21_1$ to $21_n$, each of the RS latches $22_1$ to $22_n$ varies the level of the demodulation output DOUT to obtain the data that has been transmitted.

The above-mentioned configuration allows much more kinds of data to be transmitted.

The above is the explanation of the embodiments, which is finished now, and the explanation was made as an example of a rectangular wave in each embodiment; however in the present invention, only phase information should be transmitted, whereby the rectangular wave is not always required, but a SIN wave is acceptable.

Also, in the foregoing embodiments, an edge that was caused to carry information (data) was taken as a first transition of the signal; however a last transition of the signal is also acceptable.

Further, both of the first transition and the last transition of the signal may carry the edge that is caused to carry information (data). In this case, as compared with the case that the edge that is caused to carry information (data) is taken as the first transition of the signal, or the last transition, the merit exists that a transmission speed can be doubled.

In accordance with the present invention, the phase of the signal is caused to carry information, whereby the effect is obtained of expanding the noise margin and thus enabling the high-speed transmission of the signal. Moreover, only the phase information should be transmitted, whereby the rectangular wave is not always required, but the SIN wave is also acceptable. Accordingly, the transmission line having an expensive high-frequency band is unnecessary, and the configuration can be made by the use of an inexpensive transmission line.

Also, such a 10B8B conversion as required in the conventional serial transmission is not required, and no decline in latency occurs, whereby the high-speed transmission is possible.

What is claimed is:

1. A data transmission system comprising:
    a generator which generates a reference signal, a phase difference signal having a phase difference from said reference signal, wherein said reference signal corresponds to a delayed version of clock signal and wherein said phase difference corresponds to input data;
    a selector which selects the phase difference signal from either a combination of the clock signal and said input data or a combination of a second delayed version of the clock signal and said input data;
    a phase difference detector which detects a phase difference between said reference signal and the phase difference signal selected in said selector; and
    data output unit which outputs data that corresponds to the phase difference detected in said phase difference detector.

2. The data transmission system according to claim 1, further including a plurality of said selector, said phase difference detector and said data output unit are provided.

3. A data transmission system comprising:
    a phase difference generator which generates a phase difference signal having a phase difference from a reference signal, wherein said reference signal corresponds to a delayed version of clock signal and wherein said phase difference corresponds to input data;
    a selector which selects the phase difference signal from either a combination of the clock signal and said input data or a combination of a second delayed version of the clock signal and said input data;
    a reference signal generator which generates said reference signal from the phase difference signal selected in the selector;
    a phase difference detector which detects a phase difference between said reference signal and the phase difference signal selected in said selector; and
    data output unit which outputs data that corresponds to the phase difference detected in said phase difference detector.

4. The data transmission system according to claim 3, further including a plurality of said selection selector, said phase difference detector, and said data output unit are provided.

5. A data transmitter comprising:
    a generator which generates a reference signal, and a phase difference signal having a phase difference from said reference signal, wherein said reference signal corresponds to a delayed version of clock signal and wherein said phase difference corresponds to input data; and
    a selector which selects the phase difference signal from either a combination of the clock signal and said input data or a combination of a second delayed version of the clock signal and said input data and outputs the phase difference signal.

6. The data transmitter according to claim 5, further including a plurality of said selector.

7. A data transmitter comprising:
    a generator which generates a phase difference signal having a phase difference from a reference signal, wherein said reference signal corresponds to a delayed version of clock signal and wherein said phase difference corresponds to input data; and
    a selector which selects the phase difference signal from either a combination of the clock signal and said input data or a combination of a second delayed version of the clock signal and said input data.

8. The data transmitter according to claim 7, further including a plurality of said selector.

9. A data receiver which receives a phase difference signal having a phase difference from a reference signal, wherein said reference signal corresponds to a delayed version of clock signal and wherein said phase difference signal corresponds to a either a combination of the clock signal and said input data or a combination of a second delayed version of the clock signal and said input data input, said data receiver comprising:
 a phase difference detector which detects the phase difference between said reference signal and the phase difference signal; and
 data output unit which outputs data that was caused to correspond to th phase difference detected in said phase difference detector.

10. The data receiver according to claim 9, further including a plurality of said phase difference detector and said data output unit.

11. A data receiver which receives a phase difference signal having a phase difference from a reference signal wherein said phase difference corresponds to input data, said data receiver comprising:
 a generator which generates said reference signal from the phase difference signal;
 a phase difference detector which detects a phase difference between said reference signal and the phase difference signal; and
 data output unit which outputs data corresponding to the phase difference detected in said phase difference detector.

12. The data receiver according to claim 11, further including a plurality of said phase difference detector and said data output unit.

13. A data transmission system comprising:
 a first generator which generates a first transmission signal corresponding to data being transmitted one by one, said first transmission signal having a leading phase as compared to a phase of a reference signal;
 a second generator which generates a second transmission signal corresponding to data being transmitted one by one, said second transmission signal having a lagging phase as compared to the phase of the reference signal;
 a selector which selects at least one of said first transmission signal and the second transmission signal;
 a transmitter which transmits said reference signal, and the selected transmission signal
 a receiver which receives said reference signal and said transmission signal, detects a phase difference between said reference signal and said transmission signal, and identifies whether the received transmission signal is the first transmission signal or the second transmission signal; and
 an output unit which outputs data to corresponding to the said identified transmission signal one to one.

14. A data transmission method comprising:
 generating a reference signal, and a phase difference signal having a phase difference from said reference signal, wherein said reference signal corresponds to a delayed version of a clock signal and wherein said phase difference corresponds to input data;
 selecting the phase difference signal from either a combination of the clock signal and said input data or a combination of a second delayed version of the clock signal and said input data;
 transmitting said reference signal and said selected phase difference signal;
 receiving the reference signal and the phase difference signal;
 detecting a phase difference between said received reference signal and said received phase difference signal; and
 outputting data that corresponds to said detected phase difference.

15. The data transmission method according to claim 14, wherein the operations of selecting said phase difference signal, detecting a phase difference between said reference signal and said phase difference signal, and outputting data corresponding to said detected phase difference, are performed in parallel by transmission line.

16. A data transmission method comprising:
 generating a phase difference signal having a phase difference from a reference signal, wherein said reference signal corresponds to a delayed version of a clock signal and wherein said phase difference corresponds to input data;
 selecting the phase difference signal from either a combination of clock signal and said input data or a combination of a second delayed version of the clock signal and said input data;
 transmitting said selected phase difference signal;
 receiving said phase difference signal;
 generating said reference signal from said received phase difference signal;
 detecting a phase difference between said received reference signal and said received phase difference signal; and
 outputting data that corresponds to said detected phase difference.

17. The data transmission method according to claim 16, wherein the operations of selecting said phase difference signal, detecting a phase difference between said reference signal and said phase difference signal, and outputting data that to corresponds to said detected phase difference, are performed in parallel by transmission line.

18. A data transmission system comprising:
 a first delay circuit which delays a phase of a base signal by a time to output it as a first delay signal;
 a second delay circuit which delays a phase of a base signal by a different delay time from the delay time of said first delay circuit to output it as a second delay signal;
 a selector which selects either one of said base signal or said second delay signal by data, which was input, to output it as a data signal wherein said data to be input, and said base signal and said second delay signal are caused to pre-correspond;
 synchronous output unit which synchronizes said first delay signal with the output of said selector to output it as a reference signal;
 a phase comparator which detects a phase difference between said data signal and said reference signal to output an identification signal for identifying said base signal or said second delay signal that corresponds to said phase difference; and
 a latch circuit which latches said identification signal to restore data that corresponds to a signal to be identified by said identification signal.

19. The data transmission system according to claim 18, further including a plurality of said selector, said phase comparator, and said latch circuit.

20. A data transmission system comprising:
 a delay circuit which delays a phase of a base signal by a time to output it as a delay signal;
 a selector which selects either one of said base signal or said delay signal by data, which was input, to output it as a data signal wherein said data to be input, and said base signal and said second delay signal are caused to pre-correspond;

a PLL circuit which generates a reference signal from said data signal;

a phase comparator which detects a phase difference between said data signal and said reference signal to output an identification signal for identifying said base signal or said second delay signal that corresponds to said phase difference; and a latch circuit which latches said identification signal to restore data that corresponds to a signal to be identified by said identification signal.

21. The data transmission system according to claim 20, further including a plurality of said selector, said phase comparator, and said latch circuit.

* * * * *